Aug. 29, 1972   W. C. ZEGEL   3,687,631
METHOD AND EQUIPMENT FOR CATALYTIC ANALYSIS OF GASES
Filed June 3, 1969   2 Sheets-Sheet 1
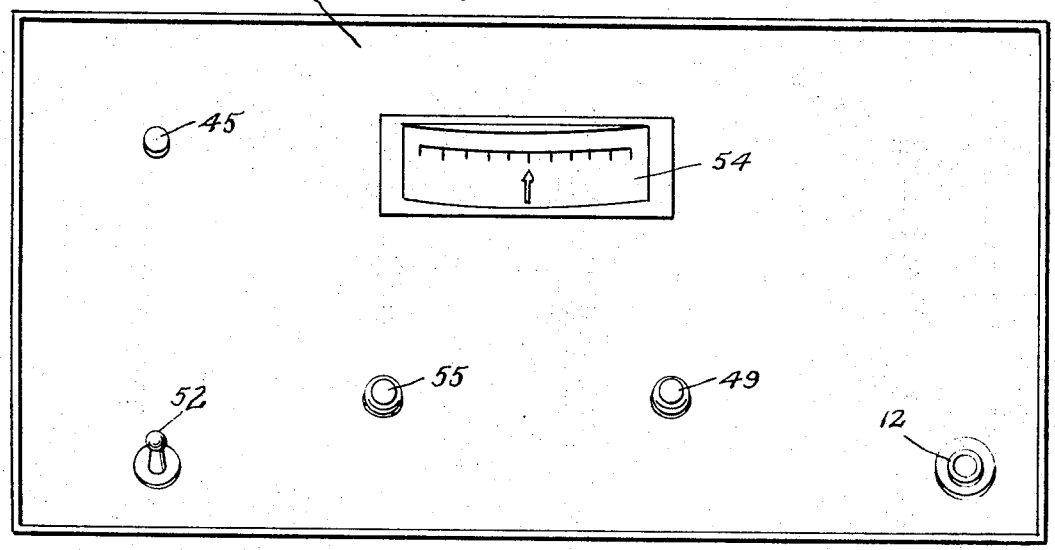
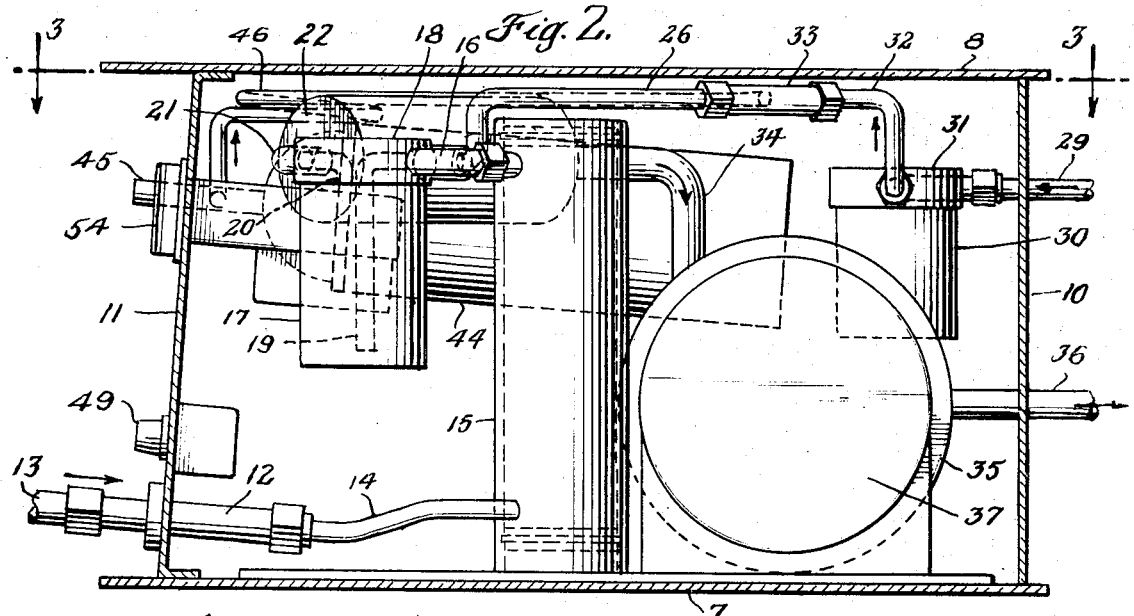
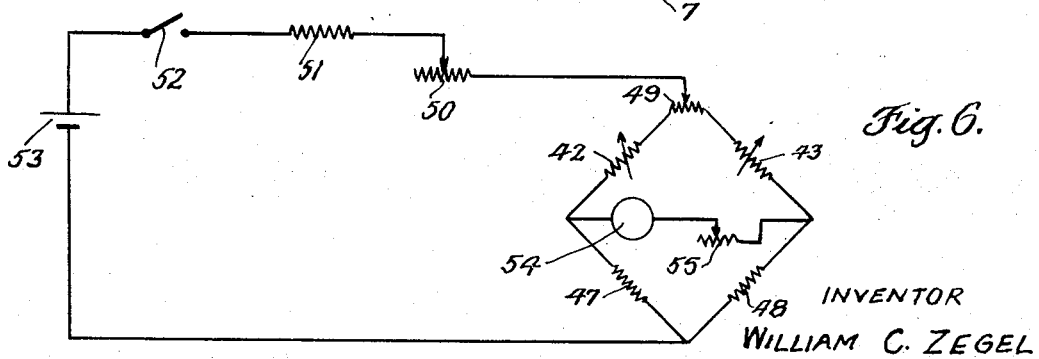
INVENTOR
WILLIAM C. ZEGEL
BY
ATTORNEYS Aug. 29, 1972  W. C. ZEGEL  3,687,631
METHOD AND EQUIPMENT FOR CATALYTIC ANALYSIS OF GASES
Filed June 3, 1969  2 Sheets-Sheet 2

INVENTOR
WILLIAM C. ZEGEL
BY
ATTORNEYS

United States Patent Office 3,687,631
Patented Aug. 29, 1972

3,687,631
METHOD AND EQUIPMENT FOR CATALYTIC
ANALYSIS OF GASES
William C. Zegel, Doylestown, Pa., assignor to Scott
Research Laboratories, Inc., Plumsteadville, Pa.
Filed June 3, 1969, Ser. No. 830,012
Int. Cl. G01n 27/16
U.S. Cl. 23—232 E                                    9 Claims

ABSTRACT OF THE DISCLOSURE

Equipment for catalytic analysis of gases, especially catalytic combustion analysis of internal combustion engine exhaust gases, comprising a combustion chamber formed in a cylindrical mass of metal and having an external heating jacket, the chamber having inlets for the gas to be analyzed and for oxygen for combustion, and further having an outlet connected with a pump for drawing the gases through the chamber. A thermally responsive catalytic element is positioned in the combustion chamber and means are provided for indicating changes in electrical resistance of the catalytic element and thereby indicating the quantity of the gas constituent being burned in the chamber. The equipment further includes a gas scrubber employing a basic material having limited solubility in water, through which the gas is passed before entering the combustion chamber, to effect separation of moisture, acid gas constituents, and also particulates, including carbonaceous and lead particulates from the exhaust gas before entry into the combustion chamber.

---

This invention relates to equipment for use in the catalytic analysis of gases, especially catalytic combustion or oxidation analysis of exhaust gases delivered from internal combustion engines. Although various features of the invention are of use in the analysis of various types of gases, since the invention is especially adapted to the analysis of exhaust gases of internal combustion engines, the invention is described herein with particular reference to its use in analysis of such exhaust gases.

Internal combustion engine exhaust gases, as is well known, contain a number of constituents which are highly detrimental from the standpoint of air pollution, notably carbon monoxide and certain unburned hydrocarbon constituents. In addition, such gases also commonly contain some moisture or water as well as acidic gas constituents, for instance $SO_2$, $H_2S$, HCl and HBr, and also $H_2$ and lead and carbonaceous particulates.

The analysis of gases of various types, including the exhaust from internal combustion engines, has been known and, in general, is effected by relatively complex and expensive equipment requiring the attention of highly skilled personnel. A simpler form of techniques is disclosed in copending application of Anthony J. Andreatch, Ser. No. 763,625 filed Sept. 30, 1968, now Patent No. 3,595,621 and in accordance with the disclosure of that application, the gas sample to be analyzed is passed through a combustion chamber in which the gas is heated and then caused to flow over the surfaces of two thermally responsive elements which are essentially similar, except for the fact that one of said elements comprises or is coated with a catalytic material capable of selectively influencing the combustion or oxidation of one of the constituents of the exhaust gas being analyzed, the other thermally responsive element being free of such catalyst. The two thermally responsive elements are subject to change in their electrical resistance value, depending upon the temperature thereof, so that when coupled into an appropriate bridge circuit, a reading may be secured indicating the relative change in resistance value of the two elements, thereby giving an indication of the concentration of the constituent or component of the gas being selectively oxidized at the surface of the element coated with the catalytic material.

Having in mind the foregoing general type of operation or technique, it is now pointed out that it is a general objective of the present invention to further improve and simplify the equipment providing for catalytic combustion analysis of the kind just described.

The invention further has in view a novel form of combustion chamber provided as a bore within a cylindrical mass of metal which mass is externally heated, thereby establishing more accurate and uniform conditions of temperature within the combustion chamber than has been practicable in prior arranegments.

Still further the invention provides for the separation of certain constituents of the exhaust gas being analyzed in advance of delivery thereof to the combustion chamber, thereby avoiding poisoning of the catalyst, which would otherwise tend to result in the presence of said constituents. The separation of these undesired constituents, and thus the avoidance of catalyst poisoning, is effected in a novel manner which makes use of the moisture present in typical internal combustion engine exhaust gases. The separation technique, moreover, also removes at least most of the moisture and this further enhances the accuracy of the catalytic combustion analysis, the presence of excessive moisture also being detrimental to the action of the catalyst.

Still another object of the invention is the provision of a novel and simply operated system for calibrating the equipment, thereby assuring that the readings secured will accurately reflect the content of the constituent of the gas being detected.

How the foregoing and other objects and advantages of the invention are attained will appear more fully from the following description referring to the accompanying drawings which illustrate a preferred embodiment of the equipment, and in which:

FIG. 1 is an elevational view of the front panel of the analyzer unit;

FIG. 2 is a vertical sectional view taken as indicated by the line 2—2 applied to FIG. 3;

FIG. 6 is a circuit diagram illustrating one form of bridge circuit which may be employed with the equipment of the remaining figures.

Figure 3:
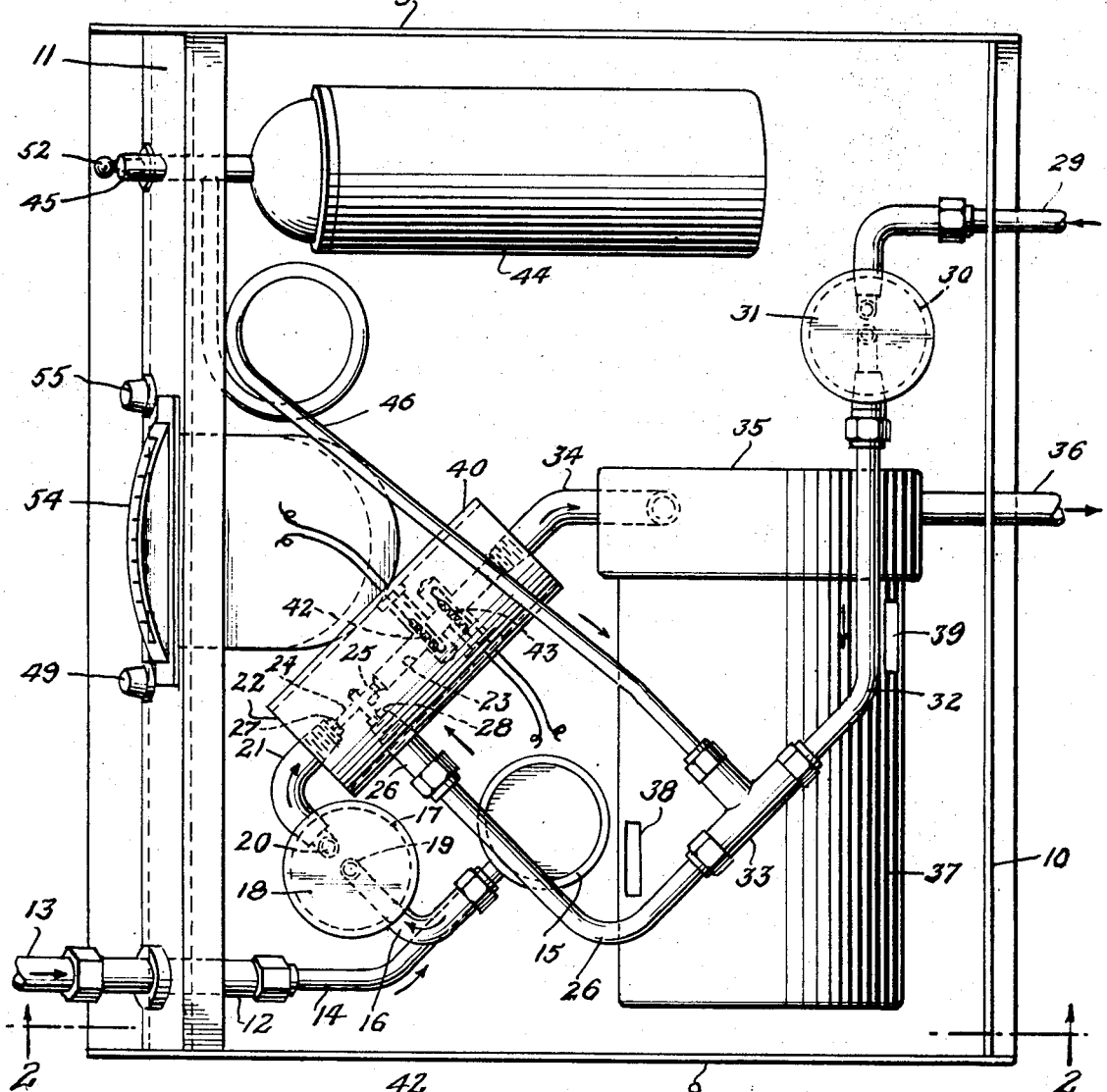
FIG. 3 is a plan view taken as indicated by the line 3—3 on FIG. 2.

The equipment is largely housed within a box having a bottom wall 7, a top wall 8, side walls 9—9, a rear wall 10, and a front panel 11.

The chief components or devices incorporated in the system are all mounted within this box and comprise the various parts described below which are interconnected and interrelated in the manner now to be described.

First note that a connection or fitting 12 is provided on the front panel 11, this fitting serving for the attachment of an exhaust gas supply line, preferably in the form of a flexible tube or connection 13 which may be extended to the exhaust pipe of an automobile. In a typical arrangement, the tube 13 terminates in a small diameter open ended pipe (considerably smaller than the inside diameter of the exhaust pipe) which is merely placed and held in the discharge end portion of the exhaust pipe, so as to receive a sample of the exhaust gases therefrom. The fitting 12 is connected by pipe 14 with the lower end of a scrubber 15. This scrubber may comprise a simple cylindrical shell having end closures, at least one of which may be readily removable to provide for access to the interior, for instance for the purpose of replenishing the bed of particulate material which is preferably contained within the scrubber. The character of that bed and its action is described more fully herebelow.

Figure 4:
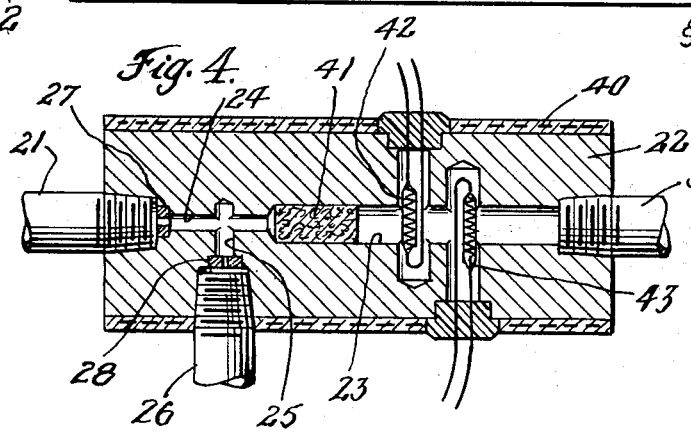
FIG. 4 is a longitudinal sectional view through the combustion chamber and certain associated parts, this view being on an enlarged scale as compared with FIGS. 1, 2 and 3.
Figure 5:
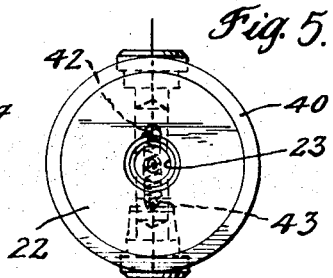
FIG. 5 is an end elevational view of the device shown in FIG. 4, taken from the righthand end of the device as viewed in FIG. 4.

From the upper end of the scrubber, a tube 16 delivers the gases to a water separator comprising a removable jar or the like 17 having a screw thread connection with a closure cap 18. The cap 18 carries a tube 19 which is connected with the pipe 16 and delivers the gases into the bottom portion of the jar 17. An offtake connection 20 is provided in the cap 18, and this delivers the gases to a pipe 21 which in turn is connected with the passage at one end of the block in which the combustion chamber is formed. This block is shown somewhat enlarged in FIGS. 4 and 5 and from those figures it will be seen that the block comprises a cylindrical mass of metal 22 having various chambers and passages formed therein. The internal passages and chambers include the combustion chamber itself indicated at 23 and the inlet passages 24 and 25. The gas supply connection 21 is associated with the passage 24, and a pipe 26 is associated with the passage 25, pipe 26 being extended to receive oxygen or air, as described below. It is here noted that in each of the inlets, a restricted orifice is provided as indicated at 27 and 28. Each of these orifices may be formed by drilling a hole through a small disc of metal, which is then secured in the inlet passageway, for instance by shrink fitting.

As seen in FIGS. 2 and 3, the pipe 26 is connected to receive air from the air supply line 29. This line 29 delivers air into a filter device which may be of essentially the same construction as the separator 15–17 described above, including a separable jar 30 and a lid 31 with which the supply line 29 is connected. The offtake from this separator or filter is connected by a pipe 32 with a T or fitting 33 with which the connection 26 is associated. With this system it will be seen that air may enter at 29 and, after separation of particulates, may be delivered through the restricted orifice 28 into the combustion chamber.

The output end of the combustion passage or chamber in the block 22 is connected by means of a pipe 34 with the input or suction side of a gas pump or blower 35, the output of which is provided with a connection 36, preferably extended through the back wall 10 of the box to an appropriate point of discharge, for instance exteriorly of a building in which the analysis is being performed.

The pump 35 is adapted to be driven by a motor within a casing 37, and preferably this motor is provided with an armature adapted to establish some air circulation, for which purpose an air inlet is provided at 38 and an air outlet at 39, the latter being positioned adjacent to an opening in the back wall 10 of the box, so that the warm air from within the motor casing may be discharged exteriorly of the box. It will be noted that the air inlet 38 is positioned adjacent to the scrubber 15, and this provides a mild cooling action over the exterior of the scrubber, for a purpose to be explained herebelow.

The cylindrical block 22 in which the combustion chamber 23 is formed is surrounded by an electrical heating jacket indicated at 40, this jacket preferably completely surrounding the cylindrical surface of the block 22 and providing substantially uniform heating of the block. The block is advantageously formed of a metal having relatively high thermal conductivity, for instance aluminum and, in the entrance end portion of the combustion chamber 23 a heat transfer medium 41 is positioned, preferably in the form of a metal wool, such as aluminum wool. The heat transfer medium is of course porous and the gas and air entering at 24 and 25 are mixed and heated as they pass through the heat transfer medium.

Within the combustion chamber there are two thermally responsive elements, one indicated at 42 and the other at 43. One of these elements, preferably the element indicated at 42, is encased within or coated with a catalytic material, such as a mixture of copper oxide and manganese dioxide. The other of the two thermally responsive elements 43 is essentially the same in structure as the element 42, except that it is not encased within catalytic material, in view of which, when carbon monoxide is being passed through the combustion chamber, the temperature of the second of these elements 43 will be different from the temperature of the element 42 with which the catalytic material is associated. These two thermally responsive elements are connected in a bridge circuit, for instance of the kind described below with reference to FIG. 6.

Before considering the operation of the equipment, including the circuit as shown in FIG. 6, it is here further noted that within the box of the apparatus, a supply of a calibrating gas or liquid is provided, for instance in the form of a replaceable aerosol can 44 having a controllable valve 45 projecting through the front panel 11. The output of the supply 44 is connected by means of a tube 46 with the T fitting 33 above referred to, so that the calibrating material may be introduced into the connection 26 which normally serves to introduce air for combustion purposes. Advantageously the tube 46 is of very small diameter, such as a capillary, so that a very small quantity of the calibrating material will be introduced into the air stream being taken into the combustion chamber.

It should also be noted that with the arrangement of gas and air inlets into the combustion chamber, the supply side of both of the restricted orifices 27 and 28 are at substantially atmospheric pressure. With this arrangement, the connection of the pump 35 at the output or discharge end of the combustion passage or chamber provides automatically for introduction of the gas to be analyzed and of combustion gas in desired relative proportions which may be determined by appropriate dimensioning of the orifices at 27 and 28. In a typical equipment employed in the analysis of exhaust gases from internal combustion engines, the orifice at 27 may be .015 inch in diameter and the orifice at 28 may be .010 inch in diameter. Other sizes of orifices may be used, but, in general, it is preferred to employ orifices which are related to each other in such manner as to provide more of the exhaust gas than of the air. For instance it is desirable to have a quantity of exhaust gas equal to from 1½ to 2½ times the quantity of air.

The positioning of the pump at the output side of the system is thus not only of advantage in providing uniformity of input of exhaust gas and air, but it is also of advantage because a single pump may then serve for the feed of the exhaust gas and of the air, instead of employing two pumps.

As above mentioned, the sensing elements 42 and 43 which are positioned in the combustion chamber are associated with an indicating circuit, for example a bridge type circuit such as shown in FIG. 6. Here the two elements 42 and 43 are indicated as being connected in two sides of the bridge, the other two sides having resistors 47 and 48 therein. A potentiometer 49 is inserted at one corner of the bridge and this instrument serves for calibration purposes. The potentiometer 49 is connected with a variable resistor 50 serving to adjust the current. The circuit further includes a fixed resistor 51, shut-off switch 52, and power supply, which may either be a rectified source of current or a battery as shown at 53, which is connected with the corner of the bridge opposite to the potentiometer 49.

The meter is indicated at 54, and this is connected across the other two corners of the bridge through a variable gain control resistor 55.

Returning again to the sensing elements 42 and 43, it should be noted that these elements resemble filaments, and are desirably made of tungsten, this metal being ideally suited to the purpose because it has a very high thermal coefficient of resistance and thus makes it possible to provide an instrument which is extremely sensitive to combustion of even small quantities of certain constituents of the gases being analyzed. Tungsten is also desirably employed because it is substantially chemically inert with respect to the components in exhaust gases. This is of special importance in the analysis of internal combustion engine exhaust gases where it is desired to detect carbon monoxide and hydrocarbons, the tungsten manifesting no catalytic activity with reference to such constituents.

The surface area of the filament or sensing element 42 is coated with a catalytic material. A particularly advantageous catalyst for this purpose is a commercially available material sold by Mine Safety Applicances Company under the trademark Hopcalite. This material is composed chiefly of a mixture of manganese dioxide and copper oxide.

In applying the catalyst to the sensing element 42 it is desirably prepared by mixing it in powdered form with a suitable cement. Although various cements may be used, the cement selected should be substantially inert with reference to the gases being analyzed. The cement should also have low absorptive characteristics and should be stable at temperatures employed in the gas analysis. A suitable cement for the purpose is a commercially available synthetic porcelain such as manufactured by Sauereisen Cement Company of Pittsburgh, Pa., U.S.A., and identified as "Cement #33." Another cement which may be employed is sodium silicate.

In coating the filament, if a synthetic porcelain cement is used, a paste of the cement and catalyst in proportion of 1 part powdered catalyst to 1 part cement is prepared and the paste is then applied, for example with a fine brush preferably covering all parts of the filament. Where sodium silicate is used, the paste preferably is prepared in a proportion of three parts of powdered catalyst to one part of the sodium silicate. In either event, the coated filament is then baked at a temperature of about 450° F. for about 8 hours.

The other sensing element 43 is desirably coated with the cement as above described, but without any catalyst, so that the readings obtained by the meter 54 will represent the diffrential in the change in resistance of the filaments in consequence of the presence of the catalyst on one filament and the absence of the catalyst on the other.

Although Hopcalite is a preferred catalyst in the detection of carbon monoxide in exhaust gases, it will be understood that various features of the invention are applicable to the detection of other gaseous components either in exhaust gases from internal combustion engines or in other gases, in which event it may be desirable to employ some other catalyst. Other usable catalysts are in general oxides of transition metals, for instance chromium oxide. Vanadium pentoxide may also be used for certain purposes.

Where it is intended to analyze for carbon monoxide specifically, the use of Hopcalite is particularly desirable, because this catalyst is effective with reference to carbon monoxide, but is not effective with reference to the burning of certain other gases.

It should further be understood that the catalytic oxidation of various components of the gases being analyzed is influenced not only by the specific catalyst employed but also by the temperature established in the combustion chamber. In a typical analysis for carbon monoxide in exhaust gases of internal combustion engines, and when using Hopcalite as the catalyst, the heater 40 surrounding the combustion chamber is desirably controlled so as to heat the gas flowing over the sensing elements 42 and 43 to a temperature between about 475° F. and about 700° F. Some variation in temperatures may be used but it is important to have a temperature above the boiling point of water. Given catalysts may be utilized for the detection of different gases, depending upon the temperature established in the combustion chamber. For example, while a temperature of about 475° F. is effective for detection of carbon monoxide in exhaust gases when using Hopcalite as catalyst, this same catalyst may be used for the detection of hydrocarbons at a somewhat different temperature, for instance of the order of 650° F.

Although the temperature at which the catalytic reaction takes place may vary somewhat, the following criteria may be observed in carrying out the reaction. Certain catalysts, such as Hopcalite noted above, are poisoned by water at relatively low temperatures. By maintaining the temperature above about 212° F. and preferably above about 250° F., the problem of water poisoning is substantially eliminated. Poisoning of the catalyst may also result during certain temperature ranges by the physical absorption of hydrocarbons. Although a catalyst deactivated by absorption of hydrocarbons can be made reactive by periodically burning off the absorbed hydrocarbons, it is preferred that the analysis be carried out at temperatures above about 475° F. when the instrument is being used to detect the presence of carbon monoxide. At these temperatures, Hopcalite is reactive only with carbon monoxide and is not poisoned by hydrocarbons. As a practical matter, an upper limit of temperature of about 750° F. is dictated by the inability of the materials of which the instrument is made to withstand higher temperatures, although higher temperatures are theoretically possible.

In cases where the catalyst employed is vanadium pentoxide, the temperature to which the catalyst must be heated is also dependent upon the component of the gas to be detected. Vanadium pentoxide has almost no response to carbon monoxide and $H_2$ at temperatures below 750° F. The hydrocarbons can thus be determined in the presence of carbon monoxide and/or $H_2$. In addition, the response can be made selective as to different hydrocarbon classes by changing the temperature at which the reaction takes place. At low temperatures, the vanadium pentoxide catalyst is very selective to reactive hydrocarbons. Increasing temperature also results in a response for higher hydrocarbons. At high temperatures, the analyzer approaches the response obtained for total hydrocarbons with a known flame ionization detector.

Another factor to be kept in mind is that various constituents of gases to be analyzed result in deactivation or poisoning of the catalyst. For example in the case of exhaust gases from internal combustion engines, water or moisture is ordinarily present, and this tends to poison the catalyst. Various acid gases present in exhaust gases also have adverse effects upon the catalyst, for example $SO_2$, $H_2S$, HCl and HBr. Lead particulates also have an adverse influence upon the catalyst.

Having in mind the foregoing detrimental influences of certain constituents upon the catalyst, the present invention contemplates preliminary treatment of the gases to be analyzed so as to separate constituents adversely influencing the catalyst. Thus in the case of analysis of internal combustion exhaust gases, it is contemplated to separate at least a portion of the water and also the acid gas constituents above referred to, as well as lead particulates.

This is accomplished in accordance with the present invention in a unique manner, as follows:

The scrubber 15 is charged with a bed of particulate basic or alkaline material, for instance carbonates or oxides of an alkaline earth metal having slight solubility in water. For example, calcium carbonate or magnesium carbonate may be used, for instance by employing crushed dolomitic limestone. Calcium carbonate in the form of crushed limestone or marble may be used. Magnesium or calcium oxide may also be used, as may carbonates of strontium, magnesium and barium. In all instances it is preferred to use these materials in particulate or fine granular form.

The exhaust gases to be analyzed are introduced through the connection 14 into the scrubber toward the bottom thereof and thus pass upwardly through the bed of basic material before being delivered through the outlet 16. In consequence of the presence of moisture in the exhaust gases, condensation of moisture occurs on the particles of the basic material, this condensation being enhanced as a result of the circulation of air over the exterior surface of the scrubber in the manner already described above, thereby cooling the scrubber. The passage of the gases upwardly through the bed of particulate material on which moisture has condensed results in solution of various of the acid gases in the condensate, and when an equilibrium condition is reached, the condensate is then carried with the gases out of the scrubber and delivered into the water separator 17–18. The separation of the water at this point is thus utilized not only to remove at least some of the moisture from the gases prior to entrance into the combustion chamber, but also to remove lead as well as acid gas constituents such as those referred to above.

The foregoing pretreatment of the gases to be analyzed enhances the analysis and serves to improve accuracy of indications given with respect, for example, to the content of carbon monoxide.

It may be noted that the total quantity of acid gas constituents present in exhaust gases of internal combustion engines is quite low, but is in any event sufficient to detrimentally influence the catalyst. Moreover, since the content of acid gas constituents is quite low, the separation of such constituents in scrubbers containing a bed of substantially inert particulate material would require counterflow of substantial quantities of water, and this is disadvantageous because of the inconvenient and unnecessary complexity involved in establishing a water connection to the equipment. By employing a scrubber bed made of a slightly soluble basic material, the small percentage of water present in the exhaust gases can be effectively used as a medium for the separation of the acid gas constituents.

It will be understood that other sources of oxygen for the combustion or oxidation process may be utilized, for instance an oxygen bottle, preferably with a pressure reduction system so as to effect introduction at substantially atmospheric pressure.

For purposes of calibration, as above indicated, a quantity of the calibration material may be delivered from the can 44 into the system along with some air. A material suitable for this purpose is methanol. Formaldehyde and formic acid may also be utilized for calibration purposes, the former being a gas and the latter a liquid. A suitable proportion when using methanol is .01 cubic foot per hour of methanol, with 1 cubic foot per hour of air. When the calibration material is introduced the potentiometer 49 may be adjusted to establish a suitable reading of the meter 54 and thereby properly calibrate the meter with respect to zero reading.

Nitrogen, or some other inert gas may be used as propellant in the bottle 44. The bottle 44 may alternatively comprise a plastic bag containing the calibrating material, the bag being positioned within a can in which a propellant gas, such as Freon surrounds the bag.

I claim:

1. A method for analyzing a water-containing mixture of combustion exhaust gases containing acidic gas components, comprising dissolving acidic gas components in water present in the exhaust gases by passing the mixture through a scrubber bed formed of particles of a basic material which is slightly soluble in water, thereafter separating the water with the acidic components dissolved therein from the remainder of the mixture by delivering the scrubbed gas mixture together with the water having acidic components dissolved therein out of the scrubber and into a liquid separator, after separation of the water and dissolved acidic components, delivering the remainder of the scrubbed mixture into a gas analyzing chamber having a thermally responsive element therein comprising a catalyst reactive with a specific component of said remainder of the mixture, and measuring the content of said specific component by measuring variations in the resistance of said element.

2. A method as defined in claim 1 in which the basic material of the scrubber bed is selected from the group consisting of calcium carbonate, magnesium carbonate, strontium carbonate, barium carbonate, magnesium oxide and calcium oxide.

3. A method as defined in claim 1 in which the exhaust gases being analyzed also contain particulates and in which the particulates are also passed through the scrubber bed and are carried with the scrubbed gases and the solution of the acidic components in the water into the liquid separator in which the particulates are separated from the scrubbed gases.

4. Equipment for use in catalytic combustion analysis of gases, comprising a mass of metal having a combustion chamber therein with a gas inlet and a gas outlet providing for passage of gases to be analyzed through said chamber, a thermally responsive catalytic element in said chamber, porous heat transfer material in the chamber upstream of the catalytic element, and a heating jacket around said mass of heat transfer material providing for heating of the heat transfer material and thus of the gases to be analyzed as they pass through the combustion chamber.

5. Equipment for use in catalytic combustion analysis of gases, comprising a combustion chamber through which gas to be analyzed is passed, a thermally responsive catalytic element in said chamber, means for indicating thermal changes of said element, means for introducing a moisture-containing gas to be analyzed into said chamber upstream of said element including a gas scrubber in which moisture is condensed, a gas pump for feed of the gas through said scrubber and said chamber, and a motor for the pump positioned adjacent the scrubber and having air circulation means for circulating air over the scrubber.

6. Equipment for use in catalytic combustion analysis of gases comprising a combustion chamber through which gas to be analyzed is passed, a thermally responsive catalytic element in said chamber, means for indicating thermal changes of said element, means for heating gas in said chamber upstream of said element, and gas supply means for delivering exhaust gas of an internal combustion engine into the combustion chamber upstream of the gas heating means and including means for separating water from the gas stream upstream of the combustion chamber and a scrubber in the gas stream upstream of said water separating means, the scrubber comprising a bed of particles of a basic material having slight solubility in water.

7. Equipment as defined in claim 6 in which the basic material of the scrubber bed is selected from the group consisting of calcium carbonate, magnesium carbonate, strontium carbonate, barium carbonate, magnesium oxide and calcium oxide.

8. Equipment as defined in claim 6 and further including means for calibrating the indicating means comprising means for introducing into the combustion chamber a measured quantity of a gas catalytically combustible in the presence said catalytic element.

9. Equipment for use in catalytic combustion analysis of gases comprising a combustion chamber through which gas to be analyzed is passed, a thermally responsive catalytic element in said chamber, means for indicating thermal changes of said element, means for heating gas in said chamber upstream of said element, and a gas supply system including a scrubber and a liquid separator, the scrubber comprising a bed of particles of a basic material having slight solubility in water, a connection delivering moisture-containing gases to the scrubber below said bed to pass upwardly therethrough, the separator comprising means for separating liquid from gaseous components, a connection delivering the scrubbed gases and liquid components from the scrubber above said bed into the liquid separator, a connection delivering the gaseous components from the separator into the combustion chamber, and means for removing the separated liquid components from the system.

References Cited

UNITED STATES PATENTS

| | | | |
|---|---|---|---|
| 1,893,490 | 1/1933 | Beekley | 23—232 |
| 2,083,520 | 6/1937 | Miller | 23—252 |
| 2,083,522 | 6/1937 | Morgan | 23—255 X |
| 2,273,981 | 2/1942 | Morgan et al. | 23—232 |
| 3,537,296 | 11/1970 | Gamache | 73—23 |
| 3,558,279 | 1/1971 | McRae et al. | 23—232 EX |

OTHER REFERENCES

V. J. Altieri.: Gas Analysis and Testing of Gaseous Materials, Amer. Gas. Assn., First Edn., 1945, p. 95 relied on.

MORRIS O. WOLK, Primary Examiner

R. M. Reese, Assistant Examiner

U.S. Cl. X.R.

23—254 E; 73—27 R